United States Patent Office 3,524,201
Patented Aug. 11, 1970

3,524,201
PULSE COHERENT TRANSPONDER
James W. Land, Jr., Springfield, Va., assignor to Control Science Corporation, Alexandria, Va., a corporation of Virginia
Filed Oct. 1, 1968, Ser. No. 764,233
Int. Cl. G01s 9/56, 9/44
U.S. Cl. 343—6.8
12 Claims

ABSTRACT OF THE DISCLOSURE

A radar transponder transmits reply pulses of R-F energy which is identical in frequency and phase coherent with R-F energy in received interrogation pulses. The interrogation pulses are converted to I-F pulses which are decoded, amplified and delayed accordingly, and then reconverted to R-F for transmission, phase coherency being maintained by utilization of the same local oscillator for conversion from and reconversion to R-F. The reconverted R-F is utilized as an injection signal for frequency-synchronizing and phase-locking an injection phase-locked oscillator, the output signal from which, in turn, may be similarly employed as an injection signal to frequency synchronize and phase-lock a further injection phase-locked oscillator. A number of phase-locked injection oscillators may be so cascaded to provide the required output power. Since the output pulse from the phase-locked injection oscillators tracks the input pulse in frequency and is phase-coherent therewith, the transponder is responsive to multiple interrogation sources operating at different frequencies within a prescribed range. Control circuitry is provided for decoding interrogation pulses and time-synchronizing the triggering of the phase-locked injection oscillators.

BACKGROUND OF THE INVENTION

The present invention relates to radar transponders, and more particularly, to transponders of the type which are installed in airborne craft, which provide delayed reply pulses in response to interrogation pulses from tracking radars, and which provide the reply in phase coherence with the interrogation pulses to permit gathering of Doppler velocity information at the tracking radar.

Design and development of radar transponders in general, and pulse coherent-type transponders in particular, requires that the design approach chosen be compatible with the operational requirements of the overall radar-transponder tracking system. Subsystems used for instrumentation and flight safety purposes, for example, at various missile ranges, consist of several radar stations, each having one or more tracking radars, located judiciously within the range along the flight paths of the test missiles. Several tracking radars may therefore be simultaneously interrogating the transponder.

In a typical situation, the launch site radar would experience a decreasing Doppler frequency while a down-range radar would experience an increasing Doppler frequency. Clearly, the transponder cannot average frequency under such conditions and give the proper frequency and phase reply to both radars. Thus, techniques employing phase locked loops or automatic frequency control loops cannot be employed. Similarly, operational requirements of the transponder, when operated with chains of radar stations, restrict the use of any averaging type of circuitry, such as automatic gain control of I-F or video amplifiers to stabilize delay variations or extend the dynamic range of the receiver. Automatic gain control of the transponder receiver would maintain a constant output pulse amplitude and shape and thus would eliminate delay variation. Unfortunately, however, automatic gain control is useful only when the transponder is tracked by a single radar. Where several radars may be simultaneously utilized to track a single transponder, the use of automatic gain control would eliminate replies to all but the strongest radar signal. It is for these reasons that the transponder of the present invention was developed to operate on a pulse to pulse basis, treating each R-F pulse on an individual basis. Since the system does not frequency average, but rather treats each pulse or pulse group on an individual basis, it is capable of responding to two or more radars whose frequencies need not be locked to one another but rather are within the bandwidth of the transponder.

Transponders of the type considered herein extend the tracking range of radar systems by providing reply pulses at substantially higher power levels than the echo or "skin tracking" pulses reflected by the transponder-bearing craft. However, in order to avoid interference between the transponder reply pulses and the "skin" pulses, the transponder reply pulse is delayed for a specified period of time. The most direct approach to transponder design is to simply delay and amplify the received radio-frequency (R-F) interrogation pulses; however, delay devices operative at the higher radio-frequencies introduce substantial signal attenuation, therefore requiring R-F amplifier elements which are too large and too heavy for practical transponder applications.

The alternative to processing the interrogation pulses at R-F is to provide some frequency translation technique whereby the processing is accomplished at some intermediate-frequency (I-F). A system in which the R-F interrogation pulses are converted to I-F pulses which are then processed and reconverted to R-F pulses to be transmitted is found in U.S. Pat. No. 2,489,273 to Dodington. By utilizing the same local oscillator for conversion from R-F to I-F and for reconversion from I-F to R-F, phase coherence between R-F interrogation pulses and the R-F reply pulses is maintained.

The Dodington transponder suffers from at least two major deficiencies when considered for use in present day missile range environments. For one thing, the output power provided by Dodington is of necessity small since no R-F amplifier stage is provided. Secondly, Dodington employs highly tuned R-F circuitry to achieve desired carrier frequency selectivity. This latter fact prevents Dodington's transponders from being employed for tracking two or more radars of different frequency. Broadening the R-F pass-band in the Dodington system to permit operation over a wider range of interrogation pulse frequencies would further reduce the already low output power.

Applicant's initial approach to this problem was to broaden the pass-band of the R-F circuitry to the extent required and employ a TWT amplifier at the transmitter to achieve the desired output power over the operating frequency range. The TWT is suitable to meet increased power requirements and also maintains the necessary phase coherence with the interrogation signal. However, the TWT suffers from the disadvantage of substantially increasing the weight and size as well as the cost and power consumption of the transponder unit.

It is therefore an object of the present invention to provide a transponder whose transmitter reply pulses are phase coherent with received interrogation and at the same radio-frequency as the interrogation pulses where the latter may be at any radio-frequency within a specified range.

It is therefore an object of the present invention to provide a radar transponder whose transmitter reply pulses are phase coherent with received interrogation pulses and provides a relatively high peak power level, and wherein the size, weight, cost and power consumption of the transponder are substantially smaller than prior art transponders having similar pulse characteristics.

It is another object of the present invention to provide a compact pulse coherent radar transponder of the type in which interrogation pulse processing is accomplished at R-F, wherein the radio-frequency of the energy in the interrogation pulses may vary on a pulse-to-pulse basis over a specified frequency range, and wherein the frequency of the energy in each reply pulse is equal to the frequency of the energy in a corresponding interrogation pulse.

It is another object of the present invention to provide a pulse coherent radar transponder in which interrogation pulse processing is accomplished by intermediate frequencies, and in which R-F amplification of the transmitted pulse is accomplished by injection phase locking techniques.

It is still another object of the present invention to provide a pulse coherent radar transponder in which amplification of the R-F reply pulse is accomplished by injection phase locking of one or more pulsed R-F oscillators, and to provide precise timing control circuitry to assure proper synchronization between pulsing of each oscillator and application thereto of a respective R-F injection signal.

It is yet another object of the present invention to provide a pulse coherent radar transponder employing injection phase-locking of a plate-pulsed triode cavity oscillator and a pulsed magnetron in cascade to achieve R-F amplification.

In addition, in order to prevent the transponder from replying to spurious pulses which may be generated in a missile range environment, the intended interrogation signal is usually a series of coded pulses, the number of pulses and spacing therebetween being predetermined. The transponder is required to provide a reply pulse only in response to a specifically coded interrogation signal, and at the same time maintain phase coherence between the interrogation signal and the reply pulse in order that Doppler velocity information is not lost at the tracking radar.

It is therefore another object of the present invention to provide a compact pulse coherent radar transponder which can be said to respond only to specified coded interrogation signals.

It is still another object of the present invention to provide a radar transponder for providing a reply pulse in response to a coded interrogation signal in the form of a predetermined number of specifically spaced interrogation pulses, and in which phase coherence is maintained between received and transmitted R-F energy.

SUMMARY OF THE PRESENT INVENTION

The transponder of the present invention is basically a "down-converter up-converter" type in which the major portion of the system gain and the required system delay is accomplished at an intermediate frequency (I-F) substantially below the radio frequency (R-F) of the received and transmitted pulses. R-F amplification of the "up-converted" pulses is accomplished by injection phase locking of one or more R-F oscillators. Injection phase locking is a technique whereby an oscillator may be pulled to the frequency and phase of an injected oscillatory signal having a freqeuncy lying within the operational bandwidth of the oscillator. In the embodiment disclosed, the "up-converted" R-F signal is utilized as an injection signal for a relatively low power triode-cavity type R-F oscillator having a bandwidth which encompasses the range of interrogation radio-frequencies to which the tarnsponder is designed to respond. The output signal from the triode-cavity oscillator, which is frequency and phase locked to each "up-converted" R-F pulse, is in turn applied as an injection signal to a relatively low Q magnetron which itself is pulled to the frequency and phase of the triode output signal. The magnetron and triode-cavity oscillator are synchronously triggered in accordance with the application of R-F injection signals thereto, triggering synchronization being accomplished by means of precise timing circuits which respond to the "down-converted" I-F signals.

Since output power levels from injection phase locked oscillators are substantially greater than the injection signal power levels, the requisite peak power of the reply pulses is readily achieved by "cascading" the injection phase-locked oscillators. Depending upon the power requirements for a given system application, one or more injection phase-locked oscillators may be employed.

Control circuitry is provided to decode interrogation signals, synchronize triggering of the triode and magnetron with application of their respective injection signals, as well as control various delays in the transponder system. The decoding and timing control functions of the control circuit are accomplished by utilizing appropriately timed monostable multivibrator and gating circuits.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DETAILED DESCRIPTION OF THE INVENTION

Figure 1:
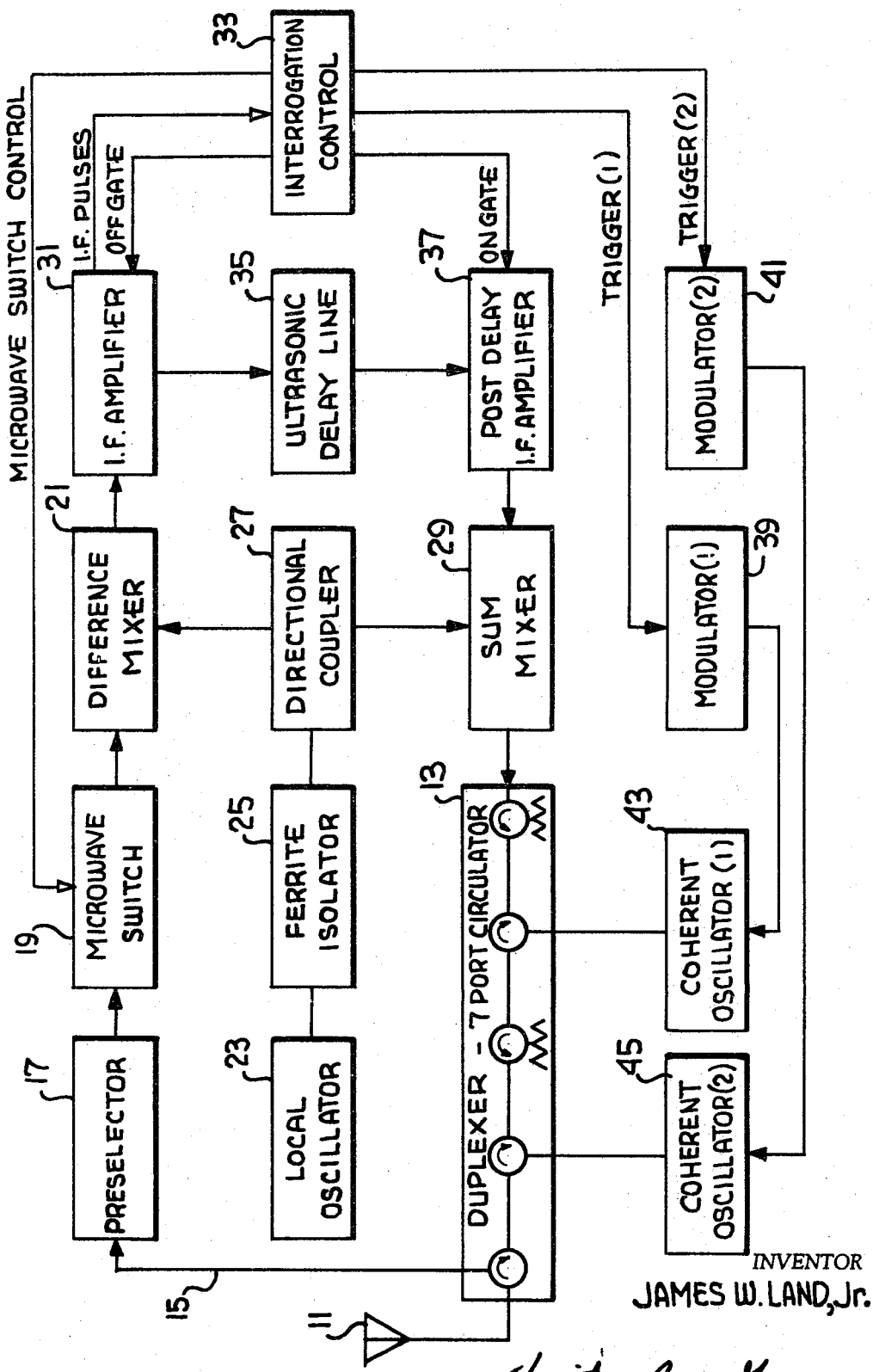
FIG. 1 is a block diagram of the pulse coherent transponder of the present invention.

Referring now specifically to FIG. 1 of the accompanying drawings, there is illustrated, in block diagram form, a transponder constructed in accordance with the principles of the present invention. A two-way antenna 11, suitable for mounting on an airborne craft, is coupled to a duplexer 13, comprising a seven-port ferrite circulator, which provides signal isolation between the transponder receiver and transmitter channels. The circulator directs received R-F energy into receiver input channel 15 where it is applied to a preselector unit 17, which by way of example, may be a three-cavity coaxial unit operating in the TEM mode. The impedance of the preselector cavities, for example, is 77 ohms so as to optimize the cavity Q and minimize losses, the cavities being preferably slug tunable over the operable radio R-F of the transponder. For example, if the transponder is intended for utilization with C-band tracking radars, a ten mHz. selectivity band with an image rejection in excess of 60 db is provided by preselector 17 when utilized in conjunction with an 80 mHz. center frequency I-F amplifier.

The R-F interrogation pulses passed by preselector 17 are applied to a crystal switch 19, which normally passes R-F energy relatively unattenuated and which responds to a microwave switch control signal to provide sufficient attenuation in the receiver front-end to protect the difference mixer 21 from burn-out during transmission of reply pulses. The R-F interrogation pulses passed by microwave switch 19 are applied to difference mixer 21.

A stabilized local oscillator (STALO) 23 also applies a signal to difference mixer 21 via ferrite isolator 25 and directional coupler 27. The output signal from difference mixer 21 comprises pulses at I-F, each pulse corresponding to a respective R-F interrogation pulse passed by microwave switch 19, the frequency of the I-F pulse energy being equal to the difference in frequency between the R-F of the interrogation pulse and the frequency of the signal provided by local oscillator 23. By way of example, in a C-band responsive transponder, local oscillator 23 may have a frequency which is adjustably set within the range of 5.4 to 5.9 gHz., and the nominal I-F frequency would be 80 mHz.

Difference mixer 21 is of the conventional heterodyne type and provides at least 10 db isolation between the local oscillator signal and the interrogation pulse signal in order to minimize both local oscillator feedthrough and noise on the transmitted signal. The local oscillator, which also provides a mixing signal via directional coupler 27 to the sum or "up-conversion" mixer 29 (to be described below) does not have any stringent long term stability requirements, as long as there is no substantial phase change in the local oscillator signal between "down-conversion" of a pulse at difference mixer 21 and "up-conversion" of that pulse at sum mixer 29. In other words, only short term stability, on the order of 5 microseconds, would affect the transmitter frequency and phase, and the temperature drift and long term stability of local oscillator 23 would be restricted only insofar as the bandwidth of the I-F circuitry is concerned.

Ferrite isolator 25, placed in series between local oscillator 23 and directional coupler 27 enhances stability of the local oscillator 23 during the pulse period by isolating it from the feedthru of the pulse output of the post delay I-F amplifier 37. Isolation on the order of at least 20 db is provided by isolator 25.

The I-F pulses provided by difference mixer 21 are applied to I-F amplifier 31, which according to the parameters hypothesized above would have a frequency of 80 mHz., a bandwidth on the order of 10 mHz., and a gain on the order of 70 db or greater. The I-F pulses amplified by amplifier 31 are applied to the interrogation control circuit 33 and to an ultrasonic delay line 35. Delay line 35 provides the required transponder delay in order that the reply pulses are transmitted sufficiently time separated from the vehicle "skin" return so that interference between the reply pulses and "skin" returns are avoided. A delay on the order of five microseconds is usually sufficient for this purpose. The delayed I-F pulses passing through delay line 35 are applied to the post delay I-F amplifier 37 which is similar to I-F amplifier 31 and is provided to compensate for any attenuation of the I-F pulses by delay line 35.

The interrogation control circuit 33, which is described in detail below in reference to FIG. 2, responds to amplified I-F pulses provided by amplifier 31, to operate microwave switch 19 during reply pulse transmission so that sufficient attenuation is provided to protect the difference mixer 21 against burn-out. In addition, the interrogation control circuit 33 provides an "off-gate" signal to I-F amplifier 31 and an "on-gate" signal to post delay I-F amplifier 37, the respective gate signals being timed to permit the full I-F pulse width to be applied to delay line 35 before amplifier 31 is gated off. In addition, the interrogation control circuit 33 provides precisely timed signals "trigger (1)" and "trigger (2)" to respective modulators 39 and 41, which serve to pulse respective coherent oscillators 43 and 45. Each amplified and delayed I-F pulse provided by amplifier 37 is applied to sum mixer 29 which also receives the modulation signal from local oscillator 23 via directional coupler 27 to provide an "up-converted" R-F pulse corresponding to each respective amplified and delayed I-F pulse received from amplifier 37. The frequency of the "up-converted" pulse is equal to the sum of the local oscillator frequency and the intermediate frequency (I-F). In addition, because the same signal from local oscillator 23 is utilized in the difference mixer 21 and sum mixer 29, the input R-F energy to difference mixer 21 and the output R-F energy from sum mixer 29 are phase-coherent; that is, the phase relationship between the difference mixer input signal and the sum mixer output signal is fixed. More specifically, the phase difference between two signals is determined by the time delay encountered by the I-F pulses in traversing the path from difference mixer 21 through I-F amplifier 31, ultrasonic delay line 35, post delay I-F amplifier 37 and sum mixer 29. Sum mixer 29 is a high level mixer which, by way of example, may employ Shottky Barrier diodes.

The sum mixer output pulses are applied to duplexer 13. The seven-port circulator of duplexer 13 provides substantial attenuation for signals travelling in any but the intended directions which are described below.

Pulsed coherent oscillator (1) 43 has its output signal applied to duplexer 13. Oscillator 43 is turned on by a pulse from modulator (1) unit 39 which in turn is activated by the trigger (1) signal. The "up-converted" R-F pulse from sum mixer 29 is employed as an injection signal which pulls the frequency and phase of oscillator 43 to precisely the frequency and phase of the sum mixer output signal. The technique by which this is accomplished is known as "injection phase locking," the theory of which may be found in the following publications incorporated herein by reference: "Phase Locking Microwave Oscillators to Improve Stability and Frequency Modulation," A. Benjaminson, The Microwave Journal, January 1963, pp. 88–92; "Locking of Magnetrons by an Injected R. F. Signal," H. L. Thal IEEE Transactions on Microwave Theory and Techniques, volume MTT–13, No. 6, November 1965, pp. 836–846; "Injection Priming of Magnetrons," The Microwave Associates, Inc., Micronotes, volume 4, No. 4, September/October 1966; "Stabilization of Microwave Oscillators by Injection Phase Locking," Walter R. Day, The Microwave Journal, March, 1967, pp. 35–39. Injection phase locking is a well-known technique and, briefly, involves feeding a relatively low power injection signal into the interaction circuit, for example, a cavity, of the oscillator to be locked. If the frequency of the injection signal is within the bandwidth of the oscillator, and the injection signal has sufficient amplitude to pull the oscillator frequency from its nominally tuned frequency, the oscillator will be frequency and phase locked to the injection signal and be at a substantially higher amplitude than the injection signal. The injection signal for coherent oscillator 43 is the R-F pulse provided by sum mixer 29.

The peak power level of the sum mixer output pulse, in a transponder of the type having the illustrative parameters described above is on the order of 10 milliwatts. On the other hand, the peak power level of the reply pulse transmitted from antenna 11 is often required to be on the order of 100 watts or greater. The 40 db gain required between sum mixer 29 and antenna 11 could readily be provided by a travelling wave tube (TWT) amplifier; however, as previously mentioned, TWT amplifiers and their requisite power supplies tend to be rather bulky and heavy and therefore not ideally suited for airborne transponder applications. By utilizing injection phase locking techniques, however, one or more of stages of injection phase locked oscillators can be employed to provide the requisite gain while maintaining phase coherence with the interrogation pulses, and at the same time permit such gain to be achieved with substantially less space utilization and significant weight reduction for the overall transponder than is the case when a TWT amplifier is employed.

In a system having the parameters described, the relatively low level power output signal from sum mixer 29 renders the sum mixer output signal unsuitable as an injection signal for a pulsed magnetron oscillator. The reason for this is that magnetron oscillators run at power levels which are sufficiently high relative to the sum mixer output power as to render the sum mixer output signal incapable of pulling the magnetron frequency over any substantial range. One requirement of the present transponder is that it must respond over a specified range of radio frequencies. For example, reply pulses may be required over a range of ±10 mHz. or more relative to some specified center radio-frequency. In order to achieve frequency pulling over so large a range in response to the relatively low level power of the sum mixer output signal, a ceramic triode-cavity microwave oscillator may be employed. The triode is plate pulsed by a signal from modulator (1) unit 39 in response to the trigger (1) signal from interrogation control circuit 33. Ceramic triode-cavity R-F oscillators of the plate pulsed type are conventional, various types of which are disclosed in "Radar Beacons," Radiation Laboratory Series, volume 3, McGraw-Hill, 1947, pp. 297–312.

A gain of 20 db or more over the sum mixer output signal is provided by the triode. The Q of oscillator 43 is sufficiently low to provide a pulling bandwidth of at least ±10 mHz. relative to the tuned nominal frequency of oscillator 43 in response to the sum mixer output signal, the nominal frequency being adjustable by means of a cavity slug or the like. The nominal peak power of the pulses provided by the triode is on the order of one watt.

Where, as assumed here, a still greater peak power is required, the output signal from coherent oscillator 43 is in turn utilized as an injection signal for coherent oscillator 45, the latter preferably being a pulsed magnetron since the power level of the output signal from oscillator 43 is sufficiently great to pull the magnetron output signal over a relatively wide frequency range. The magnetron of oscillator 45 is constructed to have a relatively low Q as compared to most present-day magnetrons, the low Q being required to permit a greater frequency pulling range. The magnetron is pulsed by a signal provided from modulator 41 in response to a trigger (2) signal from interrogation control circuit 33. Modulators 39 and 41, by way of example, may be pulse forming delay networks, which as such are well known in the art.

For a system having the illustrative parameters described, the particular choice of the triode cavity type oscillator for coherent oscillator 43 and of the magnetron for coherent oscillator 45 is significant. More specifically, the frequency of the magnetron, as mentioned above, cannot be pulled over a significant frequency range in response to the relatively low power level of the injection signal provided by sum mixer 29. In addition, the triode is substantially lighter and cheaper than the magnetron and is therefore more desirable for transponder applications. On the other hand, a magnetron is much more desirable for coherent oscillator 45 since it is much more efficient at higher power levels (for example, to provide in excess of 100 watts peak output power) than the triode. Further, triodes providing the requisite output power are not only less efficient than magnetrons but are incapable of operating over the environmental temperature ranges and frequency bandwidths required in the coherent application.

By replacing a TWT amplifier with two stages of injection phase locked oscillators of the type described, a considerable reduction in the transponder volume has been achieved; for example, the volume has been reduced by a factor of 4 and weight by a factor of 2. In addition, the injection phase locking technique has been found to reduce power consumption by the transponder by almost one-half.

Figure 2:
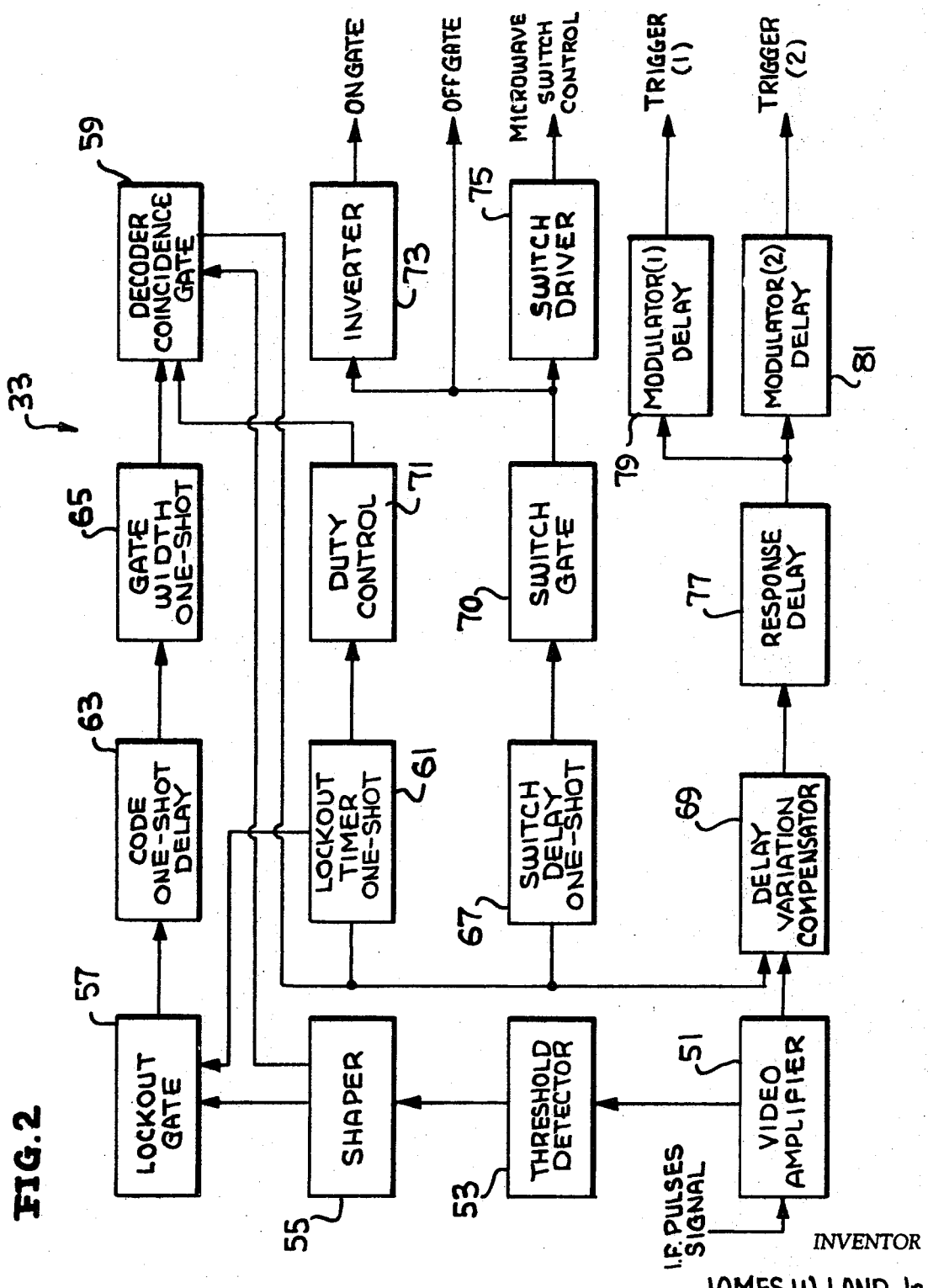
FIG. 2 is a block diagram of the interrogation control circuit employed in the transponder of FIG. 1.

Referring now specifically to FIG. 2 of the accompanying drawings, there is illustrated in block diagram form the component parts of interrogation control circuit 33 of FIG. 1. The interrogation control circuit 33 performs the following primary functions:

(A) Decoding of interrogation pulses;
(B) Compensation for variations in reply pulse delay;
(C) Blocking interrogation pulses during recovery of the coherent oscillator modulators; and
(D) Limiting the reply pulse duty cycle in cases where an overly large number of interrogation pulses are received.

Intermediate frequency pulses from I-F amplifier 31 are applied to video amplifier 51 by which the pulses are amplified to a usable level. The amplified pulses are then applied to a threshold detector 53 which is adjusted to permit only video pulses which are several db above the quiescent noise level to initiate application of pulses to pulse shaper 55. Shaper 55 is responsive to each pulse detected by threshold detector 53 to generate a narrow shaped pulse (for example, 50 nanoseconds) whose leading edge is time coincident with the leading edge of the detected pulse. Shaper 55 therefore normalizes the system for substantially any nominal input pulse width and provides a desirable narrow pulse for precision decoding to be described subsequently. The output pulse from shaper 55 is applied to lockout gate 57 and to decoding coincidence gate 59. Lockout gate 57 is a gate which receives a second signal from the lockout timer circuit 61. The lockout timer 61 is described in more detail below; however, for present purposes it is to be understood that the signal applied to lockout gate 57 from lockout timer 61 is present unless the modulators 39 and 41 of FIG. 1 have not fully recovered in response to trigger (1) and trigger (2) signals. Therefore shaped pulses from shaper 55 are blocked by lockout gate 57 only if the modulators have not fully recovered. The output signal from lockout gate 57 triggers the code one shot delay circuit 63 which is adjustable in accordance with the specified spacing of coded interrogation pulses. More specifically, the circuit of FIG. 2 is intended to permit transponder response only where two interrogation pulses of specified spacing are received. The code one shot delay circuit 63 therefore responds to a first shaped pulse provided by lockout gate 57 to provide an output pulse whose trailing edge terminates some predetermined period of time prior to the expected time of reception of a second interrogation pulse spaced from the first interrogation pulse according to the predetermined code. The trailing edge of the pulse from code one shot delay circuit 63 is applied to the gate width one shot circuit 65. The output pulse from the gate width one shot circuit 65 is applied to the decoding coincidence gate 59. Time coincidence at gate 59 of a pulse from the gate width one shot unit 65 and the shaper 55 provides an output pulse from decoding coincidence gate 59 which is applied to the lockout timer 61, to the switch delay one shot 67 and to the delay variation compensator circuit 69. Such an output pulse provided by the decoding coincidence gate 59 indicates that two pulses spaced in accordance with the predetermined code have been received, and therefore the transponder is to generate a reply pulse which is phase coherent with the second of the two coded interrogation pulses.

The lockout timer circuit 61 is a one-shot multivibrator whose period is slightly longer than the recovery time of modulators 39 and 41. During the lockout period, an inhibit pulse, as previously described, is applied to lockout gate 57 to prevent passage of shaped pulses during modulator recovery. In addition, a lockout pulse is applied to the duty control circuit 71 which integrates the lockout pulses and provides an inhibit signal to the decoding coincidence gate 59 whenever the repetition rate of lockout pulses exceeds a predetermined maximum. The inhibit signal prevents passage of pulses by decoding coincidence gate 59, thereby protecting the transmitter section (coherent oscillators 45 and 43) from burn-out that might occur due to an unduly high pulsing rate. Duty control circuit 71 may comprise a simple RC integrator which provides a DC voltage representative of the integrated lockout pulse PRF, which voltage is applied to a tunnel diode detector configured to provide the inhibit signal to gate 59 in response to a predetermined input DC voltage level.

The switch delay one shot circuit 67 is triggered by output pulses from decoding coincidence gate 59 to provide a pulse which serves as a time delay before initiation of the "on gate" and "off gate" signals which respectively, turn on post delay I-F amplifier 37 and turn off I-F amplifier 31. This delay interval is sufficiently long to permit the entire pulse provided by I-F amplifier 31 to be applied to ultrasonic delay line 35 before I-F amplifier 31 is turned off and post delay I-F amplifier 37 is turned on. Turn-off of amplifier 31 is required to prevent swamping of the amplifier 31 during transmission of a reply pulse and also prevents interference with reply pulse processing by interrogation pulses received during the decoding process in the interrogation control circuit. Post delay I-F amplifier 37 is maintained off except during the interval in which the on gate signal is received during which time it permits passage of the second pulse of a double pulse code to the sum mixer 29 for transmission as a reply pulse.

The trailing edge of the pulse provided by the switch delay one shot unit 67 triggers the switch gate unit 70 to provide the "off gate" signal applied to I-F amplifier 31 and to an inverter circuit 73 which in turn applies the "on gate" signal to post delay amplifier 37. In addition, the "off gate" signal is applied to switch driver circuit 75 which responds by providing a microwave switch control signal for application to microwave switch 19 to switch the latter so as to provide sufficient attenuation in the front end of the receiver to protect difference mixer 21 from burn-out during transmitter reply.

The delay variation compensator circuit 69 in addition to receiving the output pulse from decoding coincidence gate 59 receives amplified versions of the I-F pulses applied to video amplifier 51. The function of the delay variation compensation circuit 69 is to normalize the transponder response delay interval over the dynamic power range of the interrogation pulses. More specifically, the purpose of the delay variation compensator circuit is to maintain accurate timing for the generation of the trigger (1) and trigger (2) signals regardless of the power level of input interrogation pulses. The necessity for the delay variation compensator 69 arises from the fact that a threshold detector 53 responds more quickly to a high level pulse than a low level pulse received from video amplifier 51. This is because the higher level pulses have much steeper rise times and therefore achieve the threshold level much more quickly than do lower level pulses. If compensation were not provided for the different interrogation pulse power levels, the resultant variable detection by threshold detector 53 would produce timing inaccuracies within the system. The delay variation compensator circuit may be a conventional monostable multivibrator which is triggered by output pulses from decoding coincidence gate 59 and which is primed by energy from the amplified I-F pulses provided by video amplifier 51. The priming energy determines the width of the output pulse provided by the delay variation compensator circuit 69 when triggered. Thus, if a relatively low level I-F pulse from amplifier 51 is applied to circuit 69, a relatively small amount of priming energy is stored and a correspondingly short pulse is provided by circuit 69 in response to triggering by the decoding coincidence gate output signal. On the other hand, if a relatively large I-F pulse is provided as a priming signal to compensator circuit 69, triggering of the compensator circuit produces a relatively long output pulse. The result is that the trailing edge of the output pulse from the compensator circuit 69 is maintained constant with respect to its required timing position regardless of the interrogation pulse power.

The trailing edge of delay variation compensator output pulse triggers the response delay one-shot multivibrator 77. The trailing edge of the output pulse from the response delay circuit 77 in turn triggers the modulator (1) delay one shot 79 and the modulator (2) delay one shot 81. Tht delay one shots 79 and 81 provide the trigger (1) and trigger (2) signals which actuate modulators 39 and 41 of FIG. 1. The response delay one shot circuit 77 has an adjustable delay time to permit generation of the trigger (1) and trigger (2) signals in proper time synchronization with the R-F output pulse provided by sum mixer unit 29. The trigger (1) and trigger (2) pulses are also adjustable to permit relative timing of the pulsing of coherent oscillators (1) and (2).

The interrogation control circuit 33 of FIG. 2 can be adjusted to respond to all interrogation pulses, rather than a particular double-pulse code by simply maintaining gatewidth one-shot unit 65 turned on at all times. This may be achieved by simply throwing a switch which perpetually applies a triggering voltage to unit 65. Consequently, each output pulse from shaper 55 is passed by gate 59 irrespective of any code.

Likewise, by means of appropriate adjustments, such as potentiometers and the like, the pulse widths for the various one-shot circuits may be selected in accordance with particular code spacing and tracking radar characteristics.

The features of the present invention, particularly the utilization of injection phase locking of "cascaded" R-F oscillators to achieve desired R-F amplification, are advantageous for transponders or beacons in general and should not be construed as limited solely to use abroad airborne craft.

While I have described and illustrated one specific embodiment of my invention, it will be clear that variations of the details of construction which are specifically illustrated and described may be resorted to without departing from the true spirit and scope of the invention as defined in the appended claims.

I claim:

1. A radar transponder for transmitting pulses of radio-frequency energy which is frequency synchronized and phase coherent with radio-frequency energy in received interrogation pulses, said transponder comprising:
    means for receiving said radio-frequency interrogation pulses;
    local oscillator means for providing an alternating signal;
    first mixer means responsive to said alternating signal and to said receiver interrogation pulses for providing corresponding intermediate-frequency pulses;
    means for delaying said intermediate-frequency pulses for a predetermined period of time;
    second mixer means responsive to said alternating signal and said delayed intermediate-frequency pulses for providing corresponding pulses of radio-frequency energy equal in frequency to and phase coherent with radio-frequency energy in said interrogation pulses;
    radio frequency oscillator means responsive to injection thereinto of a relatively low power radio-frequency injection signal for providing a relatively high power radio-frequency output pulse at the same radio-frequency and phase as said injection signal; and
    means for injecting said radio frequency pulses provided by said second mixer means into said first radio-frequency oscillator means;
    whereby each relatively high power radio-frequency output pulse is transmitted by said transponder.

2. The transponder according to claim 1 wherein said radio-frequency oscillator means comprises at least first and second injection phase-locked oscillators connected in cascade.

3. The transponder according to claim 2 wherein said first radio-frequency oscillator means is a triode-cavity radio-frequency oscillator and wherein said second radio-frequency oscillator means is a magnetron, said triode-cavity and said magnetron each having a relatively low Q to permit pulling of its frequency by its respective injection signal over a relatively wide frequency range.

4. The transponder according to claim 2 wherein the radio frequency output signal power level of the output signal from each of said first and second radio-frequency oscillator means is at least 20 db greater than the power level of the respective applied radio-frequency injection signals.

5. In a radar transponder for providing R-F reply pulses which are frequently synchronized and phase coherent with received R-F interrogation pulses, the R-F of said interrogation pulses being variable on a pulse-to-pulse basis over a specified frequency range:
    means for receiving said R-F interrogation pulses;

local oscillator means for providing an alternating signal at a predetermined frequency;

first frequency mixer means responsive to said alternating signal and each received R-F interrogation pulse for providing a respective I-F pulse;

means for delaying said I-F pulses for a predetermined period of time;

second frequency mixer means responsive to said alternating signal and each delayed I-F pulse for providing a respective R-F pulse which is equal in frequency and coherent in phase to a corresponding received R-F interrogation pulse;

at least a first phase injection oscillator means responsive to simultaneous application thereto of a trigger pulse and an R-F injection signal in said specified frequency range for providing a pulsed R-F output signal having frequency and phase equal to that of said injection signal and a pulse width determined by said trigger pulse;

means for applying each R-F pulse provided by said second frequency mixer means as an injection signal to said first oscillator means;

control means responsive to each I-F pulse provided by said first frequency mixer means for applying a first trigger pulse to said first oscillator means, application of each of said first trigger pulses being synchronized with application of each R-F pulse to said first oscillator means;

wherein the pulsed R-F signals provided by said first oscillator means are at substantially higher power levels than the injection signal pulses applied thereto.

6. The transponder according to claim 5 further comprising:

at least a second phase injection oscillator means responsive to simultaneous application thereto of a trigger pulse and an R-F injection signal in said specified frequency range for providing a pulsed R-F output signal having frequency and phase equal to that of the injection signal and a pulse width determined by the trigger pulse;

means for applying each pulsed R-F output signal provided by said first oscillator means as an injection signal to said second oscillator means;

wherein said control means is responsive to each I-F pulse provided by asid first frequency mixer means for applying a second trigger pulse to said second oscillator means, application of each of said second trigger pulses being synchronized with application of each pulsed R-F signal to said second oscillator means; and means for transmitting and R-F reply pulse in response to each pulsed R-F output signal provided by said second oscillator means.

7. The transponder according to claim 6 wherein the combined power again of said first and second oscillator means is at least 40 db, combined power gain being defined as the ratio of peak power of the pulsed R-F signal provided by said second oscillator means to peak power of the pulse injection signal applied to said first oscillator means.

8. The transponder according to claim 6 wherein said second oscillator means is a magnetron having a Q which is 55 or less.

9. The transponder according to claim 8 wherein said first oscillator means is a ceramic triode-cavity R-F pulsed oscillator.

10. The transponder according to claim 6 further comprising means for amplifying said I-F pulses and said delayed I-F pulses.

11. A transponder for transmitting an R-F reply pulse in response to reception of a predetermined number of R-F interrogation pulses having a predetermined inter-pulse time delay, each interrogation pulse having an R-F frequency within a predetermined frequency range, said transponder comprising:

means for receiving said R-F interrogation pulses;

local oscillator means for providing an alternating signal at a specified frequency;

first frequency mixer means responsive to said alternecting signal and each received R-F interrogation pulse for providing an I-F pulse corresponding to each received R-F interrogation pulse;

delay means for delaying each of said I-F pulses for a specified period of time;

gating means for passing said delayed I-F pulses only in response to application of a gating signal thereto;

decoding means responsive to said predetermined number of I-F pulses having said predetermined time delay therebetween for applying a gating signal to said gating means to permit passage of the delayed I-F pulse corresponding to the last of said predetermined number of I-F pulses;

second frequency mixer means responsive to said alternating signal and each delayed I-F pulse passed by said gating means for providing a respective R-F pulse which is equal in frequency to and phase coherent with the R-F interrogation pulse corresponding to the last of said predetermined number of interrogation pulses;

at least a first pulsed injection phased locked oscillator responsive to simultaneous application thereto of a trigger pulse and an R-F injection signal in said predetermined frequency range for providing a pulsed R-F injection signal and a pulse width determined by said trigger pulse;

means for applying each R-F pulse provided by said second frequency mixer means as an injection signal to said first oscillator means;

control means responsive to said gating signal for applying a first trigger pulse to said first injection phase locked oscillator, application of each first trigger pulse being synchronized with application of each R-F pulse to said first oscillator means;

wherein the pulsed R-F signals provided by said first oscillator means are at substantially higher power levels than the respective injection signal pulses applied thereto; and means for transmitting each pulsed R-F signal provided by said first oscillator means as a respective reply pulse.

12. The transponder according to claim 11 wherein said predetermined number of pulses is two.

References Cited

UNITED STATES PATENTS

| | | | |
|---|---|---|---|
| 2,489,273 | 11/1949 | Dodington | 250—17 |
| 3,079,557 | 2/1963 | Crabtree | 343—6.8 X |
| 3,226,714 | 12/1965 | Applegarth | 343—6.8 |
| 3,418,655 | 12/1968 | Baylor | 343—6.5 |

OTHER REFERENCES

"Locking of Magnetrons by an Injected R. F. Signal," by H. L. Thal, IEEE Transactions on Microwave Theory and Techniques, vol. MTT–13, No. 6, November 1965, pp. 836–846.

RICHARD A. FARLEY, Primary Examiner

M. F. HUBLER, Assistant Examiner

U.S. Cl. X.R.

343—8